No. 822,891. PATENTED JUNE 5, 1906.
J. M. GREIST, DEC'D.
M. F. W. & P. R. GREIST, ADMINISTRATORS.
BELT COUPLING.
APPLICATION FILED OCT. 14, 1905.
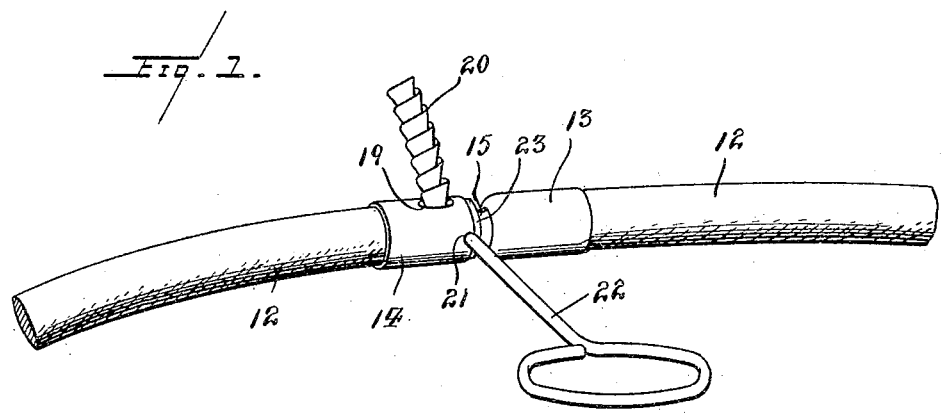
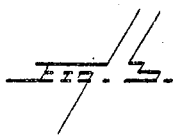
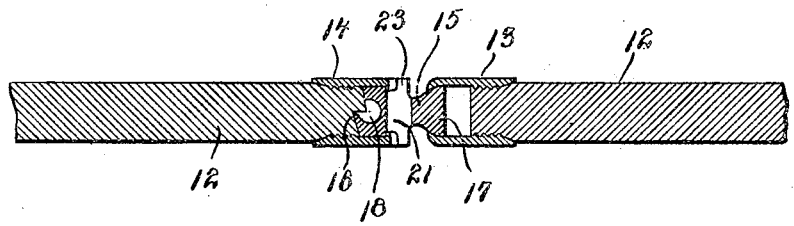
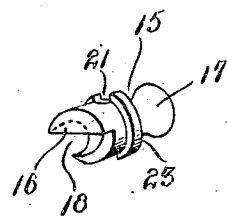
WITNESSES:
W. H. Doyle
C. M. Sweeney
INVENTOR:
John M. Greist,
By Henry Calver,
Attorney.

UNITED STATES PATENT OFFICE.

JOHN M. GREIST, OF NEW HAVEN, CONNECTICUT; MARY F. W. GREIST AND P. RAYMOND GREIST ADMINISTRATORS OF SAID JOHN M. GREIST, DECEASED, ASSIGNORS TO THE GREIST MANUFACTURING COMPANY, A CORPORATION OF CONNECTICUT.

BELT-COUPLING.

No. 822,891.  Specification of Letters Patent.  Patented June 5, 1906.

Application filed October 14, 1905. Serial No. 282,839.

*To all whom it may concern:*

Be it known that I, JOHN M. GREIST, a citizen of the United States, residing at New Haven, in the county of New Haven and State of Connecticut, have invented or discovered certain new and useful Improvements in Belt-Couplings, of which the following is a specification, reference being had therein to the accompanying drawings.

This invention relates to that class of belt-couplings for round belts in which one of the coupling members which has a screw-threaded attachment to an end of a belt is provided with a blade or cutter which is so mounted on the said coupling member as to be adapted to pare off the end of the belt when it is desired to shorten such belt to take up slack; and the invention has for its object to provide a belt-coupling of the class referred to which, while efficient and convenient in use, may be easily constructed at little cost.

The improved coupling comprises in its preferred form two internally-threaded sleeves joined together by a third or cutter member which is rigidly secured at one end to one of said sleeves, within which the blade or cutter is housed and the other end of which third member has a swivel connection with the other of said sleeves. The coupling thus consists of only three parts or members, two of which are fixed together, so as to be capable of being simultaneously rotated to screw a coupling member farther onto the belt and to pare off the end of the latter when said belt is to be shortened.

In the accompanying drawings, Figure 1 is a perspective view illustrating the invention. Fig. 2 is a longitudinal sectional view through the coupling and belt. Fig. 3 is a detail view of the cutter and swivel member.

Referring to the drawings, 12 denotes the ends of a belt and to one of which ends is attached in any suitable manner a coupling tube or sleeve 13. In the present instance said sleeve is shown as being internally threaded, so that it is simply screwed onto the end of the belt, and this is the preferred form of the invention.

14 is an internally-screw-threaded tube or sleeve, to which is rigidly fixed the third or connecting member 15 of the coupling. This member 15 is provided at one end within said sleeve 14 with an inclined blade or cutter 16, adapted to pare off the end of the belt when the sleeve 14, to which the connecting member 15 is rigidly attached, is screwed farther onto the belt, so as to bring the cutter against the end of the belt, the said member 15 having at its other end a semispherical or swivel portion 17, loosely fitting within the contracted outer end of the sleeve 13, so as to provide a swivel connection for the two sleeves 13 and 14. The blade or cutter is inclined or diagonally-disposed relative to the longitudinal axis of the coupling or of the belt, so as to cut a spiral shaving from the adjacent end of the belt when the coupling-sleeve 14, to which the intermediate cutter-carrying member 15 is attached, is turned.

The cutter and swivel or connecting member is provided at its cutting end with a conical or tapering clearance-recess 18, which registers with a hole 19 in the sleeve 14, so that the belt-parings can escape through said hole in the form of a spiral shaving 20.

To provide means for turning the coupling-sleeve 14 and its attached cutter when said sleeve and cutter are to be advanced onto the end of the belt to pare off and thus shorten the latter, the member 15 is provided with a diametric hole 21, into which a pin or wrench, as 22, may be inserted for the purpose of turning the sleeve and cutter. This diametric hole 21 preferably intersects a small peripheral flange 23 on the member 15 and against which flange the outer end of the sleeve 14 abuts, so that when the two parts are put together the outer end of the sleeve partly overlies said hole. This permits the said sleeve (which is preferably of relatively soft material, as brass) and the cutter and swivel member (which is of steel) to be rigidly secured together simply by punching or otherwise forcing a small part of the metal of the sleeve into the ends of the hole 21, (see Fig. 2,) but without obstructing the said hole to any considerable extent. This manner of attaching the members 14 and 15 rigidly together is very desirable in that the attaching operation may be easily and quickly performed.

From the foregoing it will be apparent that the entire coupling, with its swivel connection and cutter, comprises but three parts which are of simple construction and which can be readily assembled together, so that the coupling may be made at comparatively little cost.

Having thus described my invention, I claim and desire to secure by Letters Patent—

1. A belt-coupling consisting of two sleeves and an intermediate connecting member rigidly attached to one of said sleeves and within which latter said intermediate member is provided at one end with an inclined or diagonally-disposed blade or cutter, said intermediate member being swiveled at its other end to the other of said sleeves.

2. A belt-coupling consisting of two internally-threaded tubes or sleeves and an intermediate connecting member rigidly attached to one of said sleeves and within which latter said intermediate member is provided at one end with an inclined or diagonally-disposed blade or cutter, said intermediate member being swiveled at its other end to the other of said sleeves.

3. A belt-coupling consisting of two sleeves and an intermediate connecting member rigidly attached to one of said sleeves and within which latter said intermediate member is provided at one end with an inclined or diagonally-disposed blade or cutter, said intermediate member being swiveled at its other end to the other of said sleeves and being provided with a diametric hole into which sufficient of the metal of the attached sleeve is forced to rigidly connect the two parts together.

In testimony whereof I affix my signature in presence of two witnesses.

JOHN M. GREIST.

Witnesses:
HENRY CALVER,
C. M. SWEENEY.